United States Patent [19]

Siegenthaler

[11] Patent Number: 5,330,337
[45] Date of Patent: Jul. 19, 1994

[54] ROAD VEHICLE TIRE CURING DEVICE

[75] Inventor: Karl J. Siegenthaler, Rome, Italy

[73] Assignee: Bridgestone Corporation, Tokyo, Japan

[21] Appl. No.: 967,345

[22] Filed: Oct. 27, 1992

[30] Foreign Application Priority Data

Oct. 31, 1991 [IT] Italy .................. TO91A 000825
Jul. 1, 1992 [IT] Italy .................. T092A 000551

[51] Int. Cl.⁵ .................................................. B29C 35/02
[52] U.S. Cl. ........................................ 425/36; 425/40; 425/42; 425/44
[58] Field of Search .............. 425/28.1, 36, 40-42, 425/44, 47, 50

[56] References Cited

U.S. PATENT DOCUMENTS

| | | | |
|---|---|---|---|
| 2,340,191 | 1/1944 | Kuhlke | 264/334 |
| 3,553,778 | 1/1971 | Woodhall | 425/40 |
| 4,238,174 | 12/1980 | MacMillan | 425/44 |
| 4,395,209 | 7/1983 | Singh et al. | 425/40 |
| 5,186,951 | 2/1993 | Siegenthaler | 425/40 |

FOREIGN PATENT DOCUMENTS

| | | |
|---|---|---|
| 0246495 | 11/1987 | European Pat. Off. |
| 0467314 | 1/1992 | European Pat. Off. |
| 621184 | 4/1949 | United Kingdom |
| 2185211 | 7/1987 | United Kingdom |

*Primary Examiner*—James Mackey
*Attorney, Agent, or Firm*—David A. Thomas

[57] ABSTRACT

A device for curing road vehicle tires, wherein an annular mold for forming a green tire, presents two inner annular supports supporting respective bead portions of the tire and defining seats for respective opposite portions of a gas curing unit. One of the two portions is connected to the other through the annular mold by means of a releasable joint, and presents axial thrust devices for packing the forming mold and the two annular heating plates against the other portion.

17 Claims, 6 Drawing Sheets

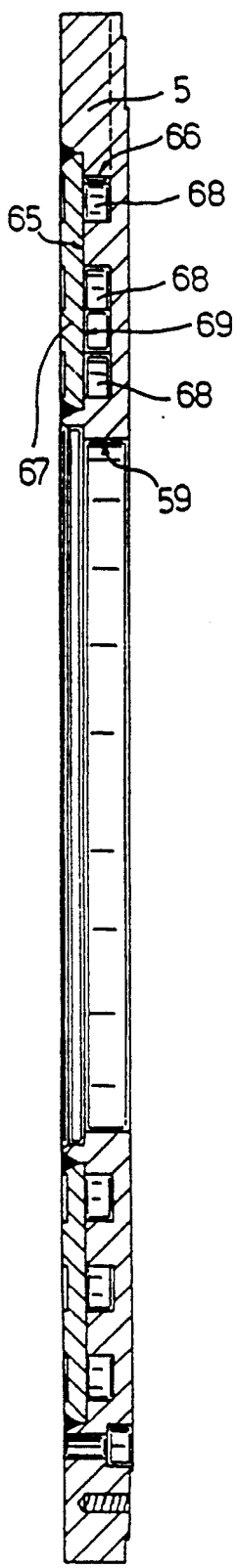
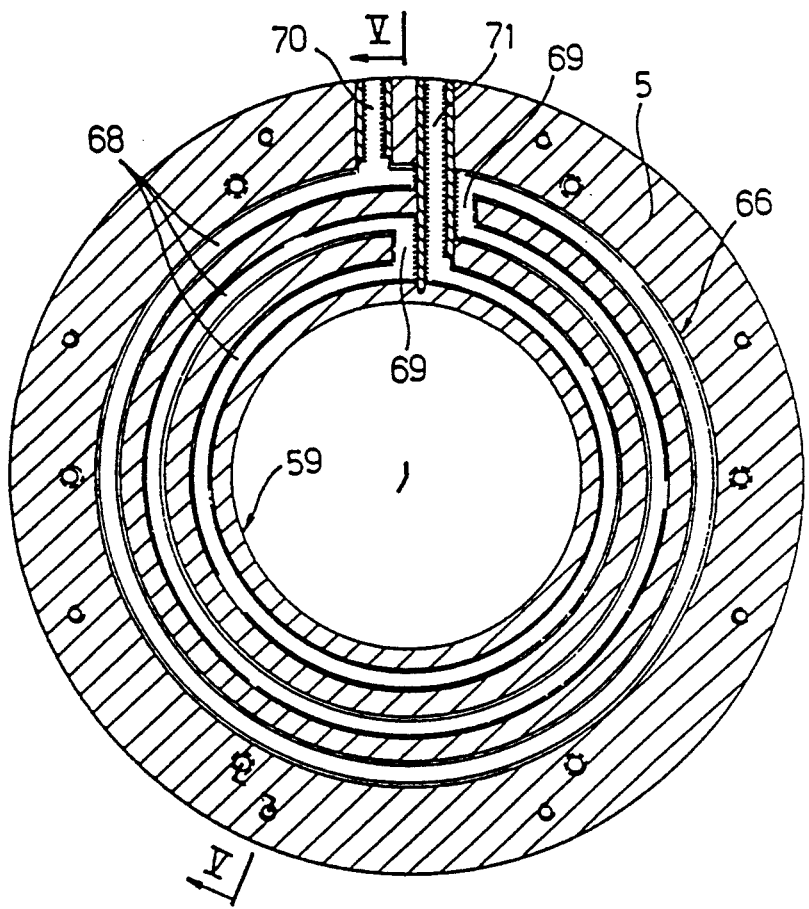
Fig.5
Fig.4

ROAD VEHICLE TIRE CURING DEVICE

BACKGROUND OF THE INVENTION

1. Technical Field

The present invention relates to a road vehicle tire curing device.

2. Background Information

Co-pending U.S. Patent application being filed concurrently herewith, corresponding to co-pending U.S. patent application Ser. No. 07/966,977, filed Oct. 27, 1992, to which full reference is made herein in the interest of full disclosure, relates to a road vehicle tire manufacturing process whereby a green tire is assembled inside an annular forming mold consisting of an outer annular body; two inner annular supports, each fitted to a respective bead portion of the tire; and two lateral annular plates connecting the two inner annular supports and the outer annular body. According to the above process, the tire so formed is kept inside the forming mold until after curing.

SUMMARY OF THE INVENTION

It is an object of the present invention to provide a curing device designed to enable implementation of the above process in as straightforward a manner as possible, i.e. to enable the tire to be cured inside the aforementioned forming mold.

It is a further object of the present invention to provide a curing device enabling the tire to be closed inside the forming mold with no need for presses to compression systems in general, external to the curing device.

Yet a further object of the present invention is to provide a curing device designed to receive not only the aforementioned forming mold but also any type of curing mold currently employed on standard curing presses.

According to the present invention, there is provided a road vehicle tire curing device comprising a toroidal mold for receiving said tire and having a first and second coaxial cylindrical inner surfaces; external means for heating said mold; and a gas curing unit connected to said mold and comprising a first and second portion on either side of the mold; characterized by the fact that each of said cylindrical surfaces define a seat for a respective said portion of the curing unit; a releasable joint being provided for connecting the two portions of the curing unit through the mold; and one of the two portions of the curing unit comprising axial thrust means for packing the mold and external heating means against the other portion.

BRIEF DESCRIPTION OF THE DRAWINGS

A non-limiting embodiment of the present invention will be described by way of example with reference to the accompanying drawings, in which:

FIG. 4 shows a section along line IV—IV in FIG. 3;

FIG. 5 shows a section along line V—V in FIG. 4;

BEST MODES FOR CARRYING OUT THE INVENTION

Figure 1:
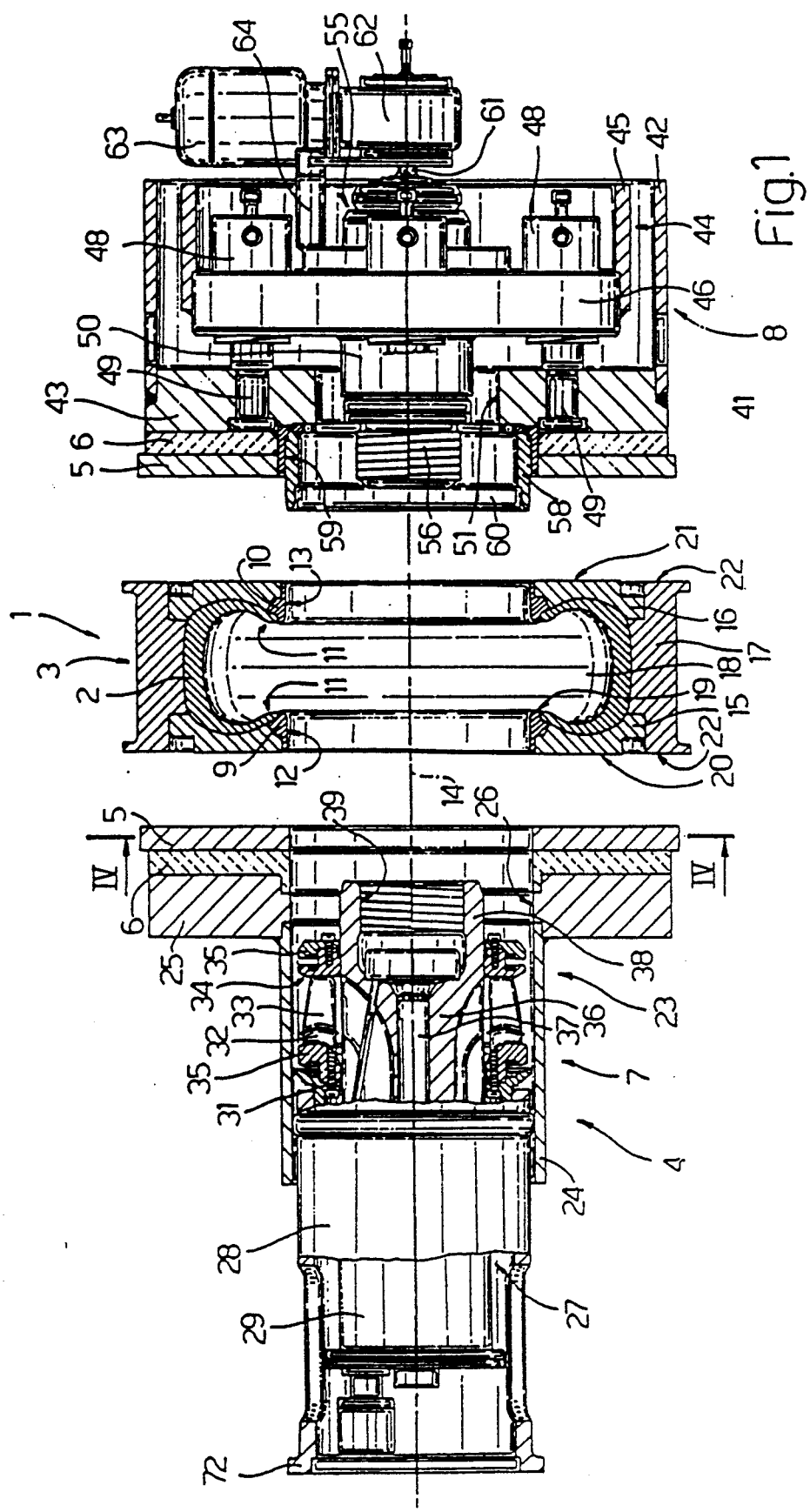
FIG. 1 shows an axial section of a preferred embodiment of the curing device according to the present invention in one operating position.

Number 1 in FIG. 1 indicates a device or unit for curing road vehicle tires 2. Device 1 comprises a toroidal curing mold 3; a gas curing unit 4 connected to mold 3; two annular heating plates 5 facing opposite axial ends of mold 3; and two annular insulating plates 6, each connected to and outwardly insulating a respective heating plate 5.

Curing unit 4 comprises a first and second portion 7 and 8 on opposite sides of mold 3, which consists of a forming mold for a green tire 2, as described in the previously referenced U.S. patent application Ser. No. 07/966,977, to which full reference is made herein in the interest of full disclosure.

Mold 3 comprises first and second inner annular supports 9 and 10 for supporting respective bead portions 11 of tire 2. Annular supports 9 and 10 are defined internally by respective cylindrical surfaces 12 and 13 coaxial with axis 14, and are connected in a releasable manner to the inner edge of respective annular plates 15 and 16, the outer edge of each being connected in a releasable manner to a respective axial end of an outer annular body 17. Together with annular plates 15 and 16 and annular supports 9 and 10, outer annular body 17 defines a toroidal bladder 18 having an inner surface negatively reproducing the outer surface of finished tire 2. Bladder 18 is accessible from the inside through an annular opening 19 defined between annular supports 9 and 10 and extending about axis 14.

As shown in FIG. 1, annular plates 15 and 16 present respective outer lateral surfaces 20 and 21 projecting slightly outwards in relation to respective end surfaces 22 of annular body 17.

Portion 7 of curing unit 4 is positioned coaxial with axis 14, facing annular plate 15 of mold 3, and comprises a supporting frame 23 defined by a tube 24 coaxial with axis 14 and fitted with an annular plate 25 on the end facing mold 3. The surface of plate 25 facing mold 3 is fitted with an insulating plate 6 and a heating plate 5 on top of plate 6.

Tube 24, plate 25 and plates 6 and 5 integral with plate 25, define a through conduit 26 of substantially the same diameter as cylindrical surface 12 of annular support 9. Conduit 26 is fitted inside with a turbine device 27 sliding in a fluidtight manner, inside conduit 26, between an idle backup position (FIGS. 1 and 2) and a forward operating position (FIG. 3).

Device 27 is of the type described in U.S. Pat. No. 5,186,951, to which full reference is made herein in the interest of full disclosure. Device 27 comprises a tubular body 28 sliding along conduit 26 and housing the drive motor 29 of a fan 30 for circulating heat exchange gas along a pneumatic circuit 31. Circuit 31 comprises an annular supply conduit 32 and an annular return conduit 33, the first outside the second, and both coaxial with axis 14. Conduits 32 and 33 come out through an annular opening 34 defined between two annular grip devices 35 coaxial with axis 14. Grip devices 35 are located outwards of the end of tubular body 28 facing mold 3, and are connected integral with tubular body 28 for supporting the opposite ends of an optional curing bladder (not shown).

The inner surface of annular return conduit 33 is defined by an elongated central core 36 housing a heating element 37, and has a cylindrical head 38 extending coaxially with axis 14 towards mold 3 and beyond grip devices 35, and has an internally threaded dead axial hole 39.

By means of external actuating devices (not shown), portion 7 of curing unit 4 is moved between a backup position (FIG. 1), wherein heating plate 5 is detached from surface 20 of annular plate 15, and a forward position (FIGS. 2 and 3), wherein heating plate 5 contacts surface 20 and defines a relatively narrow opening 40 with surface 22, wherein conduit 26 and the passage defined by cylindrical surface 12 of annular support 9, are a continuation of each other.

Figure 2:
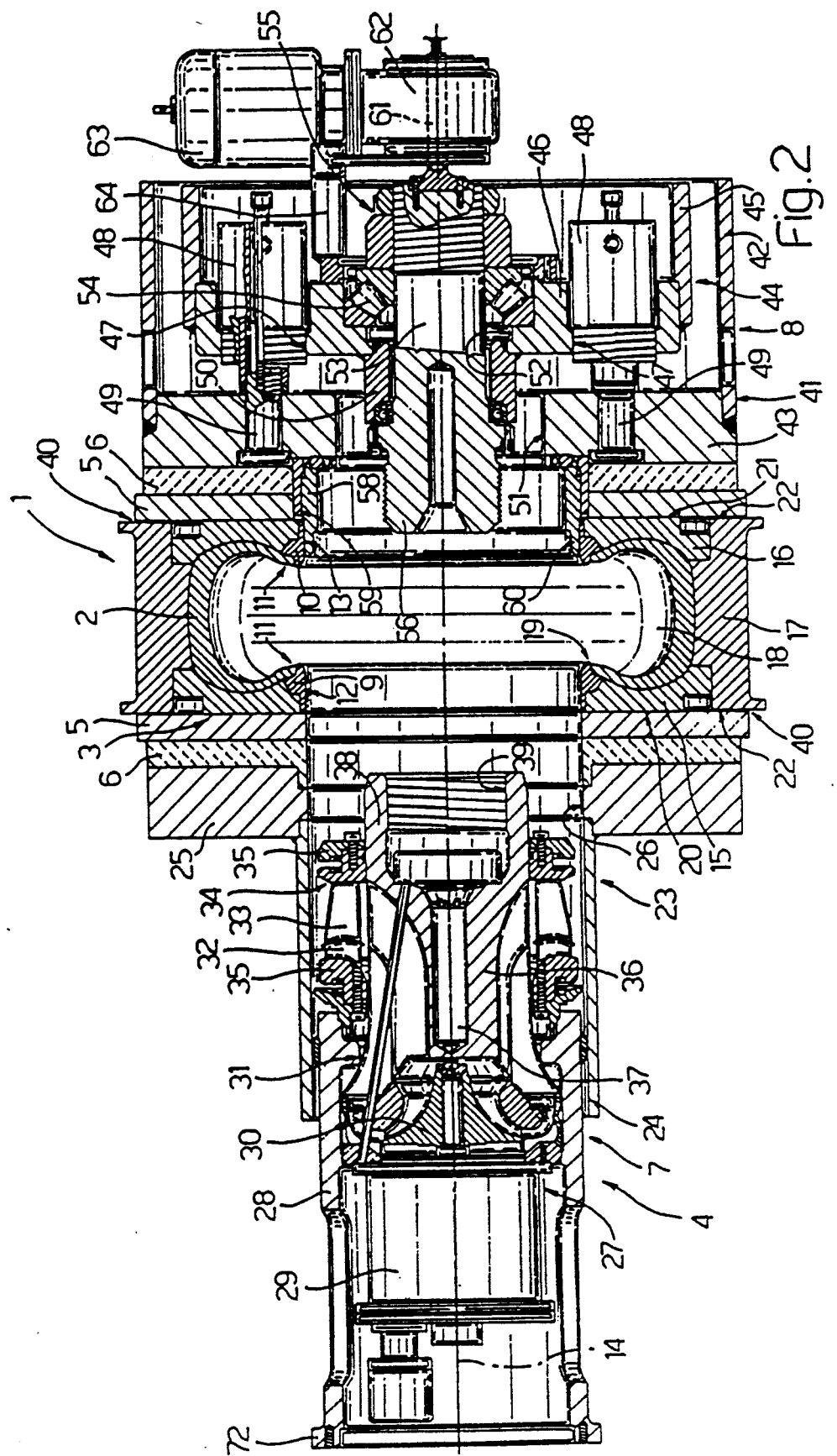
FIGS. 2 and 3 show axial sections of the FIG. 1 device in two further operating positions.
Figure 3:
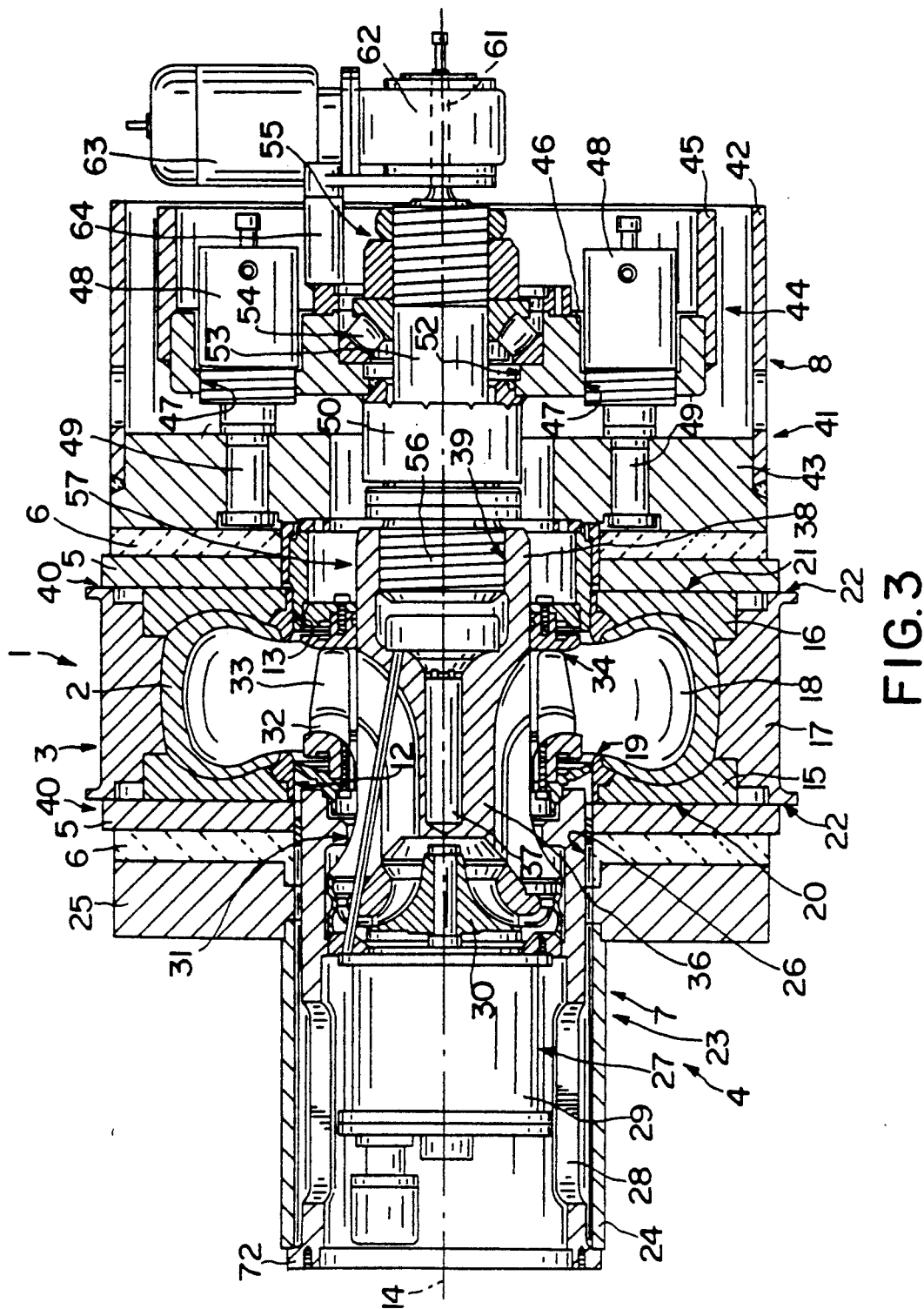

By means of a further external actuating devices (not shown), tubular body 28 slides along conduit 26 between the backup position in FIGS. 1 and 2 and the forward position in FIG. 3. When portion 7 of curing unit 4 is in the forward position, annular opening 34 coincides with opening 19, and circuit 31 is closed through toroidal bladder 18.

As shown more clearly in FIG. 2, portion 8 of curing unit 4 comprises a cup-shaped frame 41 defined by a substantially cylindrical lateral wall 42 coaxial with axis 14, and closed on the side facing mold 3, by a plate 43 similar to plate 25, and fitted integral with plates 6 and 5 facing annular plate 16 of mold 3.

Inside, frame 41 supports a further cup-shaped body 44 comprising a substantially cylindrical lateral wall 45 coaxial with axis 14 and closed, on the side facing plate 43, by a plate 46. A peripheral portion of plate 46 presents a number of equally-spaced through holes 47, each engaged by the body of a hydraulic jack 48. Jack 48 is integral with plate 46 and has an output rod 49 connected axially integral with plate 43.

Plate 46 is fitted integral with a central coupling 50 extending from plate 46 through a central hole 51 in plate 43, and communicates with a central hole 52 through plate 46. Hole 52 and coupling 50 are engaged in a rotary axially-fixed manner by a shaft 53 connected to plate 46, via the interposition of a thrust bearing 54 which is gripped against plate 46 by a double-ring-nut clamping device 55.

A first end portion of shaft 53 consists of a threaded pin 56 coaxial with axis 14 which constitutes the screw element of a releasable screw-nut screw joint 57. The nut screw element of joint 57 consists of an internally threaded head 38 of a core 36. Pin 56 is fitted inside a coupling 58 engaged inside a central hole 59 in plates 5 and 6, and projecting outwards of plate 5 to form a tubular appendix 60. The outside diameter of appendix 60 is approximately to but no larger than the diameter of cylindrical surface 13 of tubular support 10. A second end portion of shaft 53 opposite pin 56, is connected to the output shaft 61 of a reduction gear 62 which is connected to the output of a motor 63 supported on plate 46 by an upright 64.

By means of external actuating devices (not shown), portion 8 of curing unit 4 is moved between a backup position (FIG. 1), wherein heating plate 5 is detached from surface 21 of annular plate 16, and a forward position (FIGS. 2 and 3), wherein heating plate 5 contacts surface 21 and defines a further relatively narrow annular opening 40 with surface 22, and wherein tubular appendix 60 engages in sliding manner the seat defined by cylindrical surface 13 of annular support 10.

As shown in FIGS. 4 and 5, each annular heating plate 5 presents a sunken annular portion 65, the end surface of which presents a groove 66 closed by an annular cover 67 housed inside annular portion 65 so as to define a number of round concentric conduits 68 connected by radial conduits 69. The outermost and innermost conduits 68 communicate externally by means of respective radial inlet and outlet conduits 70 and 71, for a heat exchange fluid. Alternatively, conduits 68 house electric resistors (not shown), the terminals of which come out through conduits 70 and 71.

In actual use, portions 7 and 8 of curing unit 4 are initially separated, as shown in FIG. 1, for inserting mold 3 between portions 7 and 8 and coaxial with axis 14. Mold 3 may of course be set up contacting one of portions 7 and 8, e.g. portion 7, so that only one portion need be moved axially for gripping mold 3.

Once mold 3 is setup between portions 7 and 8, they are brought together so as to grip mold 3 as shown in FIG. 2, wherein plates 5 contact surfaces 20 and 21 of annular plates 15 and 16 of mold 3. Appendix 60 of portion 8 engages the seat defined by cylindrical surface 13, and turbine device 27 is in the idle backup position outside the seat defined by cylindrical surface 12.

At this point, turbine device 27 is pushed into the forward operating position through the seat defined by cylindrical surface 12 and mold 3, so as to bring head 38 into contact with pin 56. Pin 56 is rotated by motor 63 so as to screw inside hole 39 and close joint 57 (FIG. 3) connecting portions 7 and 8, and bringing the free end of tube 24 into contact with outer flange 72 of tubular body 28.

In the above configuration, turbine device 27 is integral with plate 46, and by virtue of tube 24 contacting flange 72, plate 25 is axially fixed in relation to plate 46. Consequently, when jacks 48 are operated, the axial pressure exerted by plate 43 provides for packing, between plates 25 and 43, the assembly consisting of mold 3 and the two pairs of plates 5 and 6.

In connection with the above, it should be pointed out that this axial pressure, which is sufficient for keeping mold 3 closed during the curing process, perforated in a known manner when curing unit 4, is positioned as shown in FIG. 3, is an internal pressure applied with no need for presses or other similar external devices.

Another point to note is that, by virtue of openings 40, a heat gap is formed between heating plates 5 and annular body 17 of mold 3, which substantially insulates annular body 17 from plates 5. This enables annular body 17 to be heated, by means not shown, substantially independently of annular plates 15 and 16.

Yet another point to note is that heating plates 5 are so designed as to enable them to be heated to the required temperature using any type of fuel or heat exchange fluid.

Figure 6:
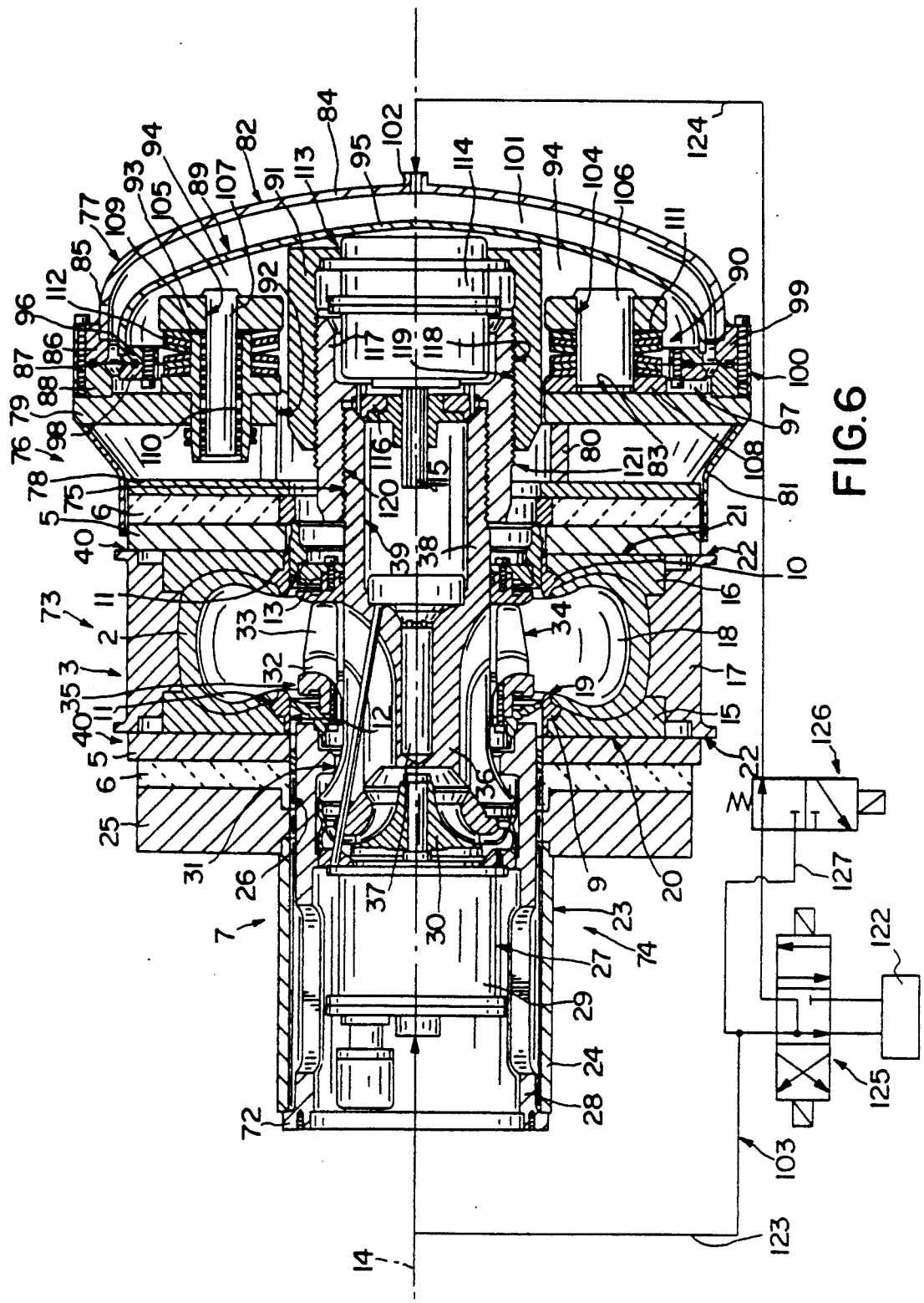
FIG. 6 shows an axial section, as in FIG. 3, of a second preferred embodiment of the curing device according to the present invention in one operating position.
Figure 7:
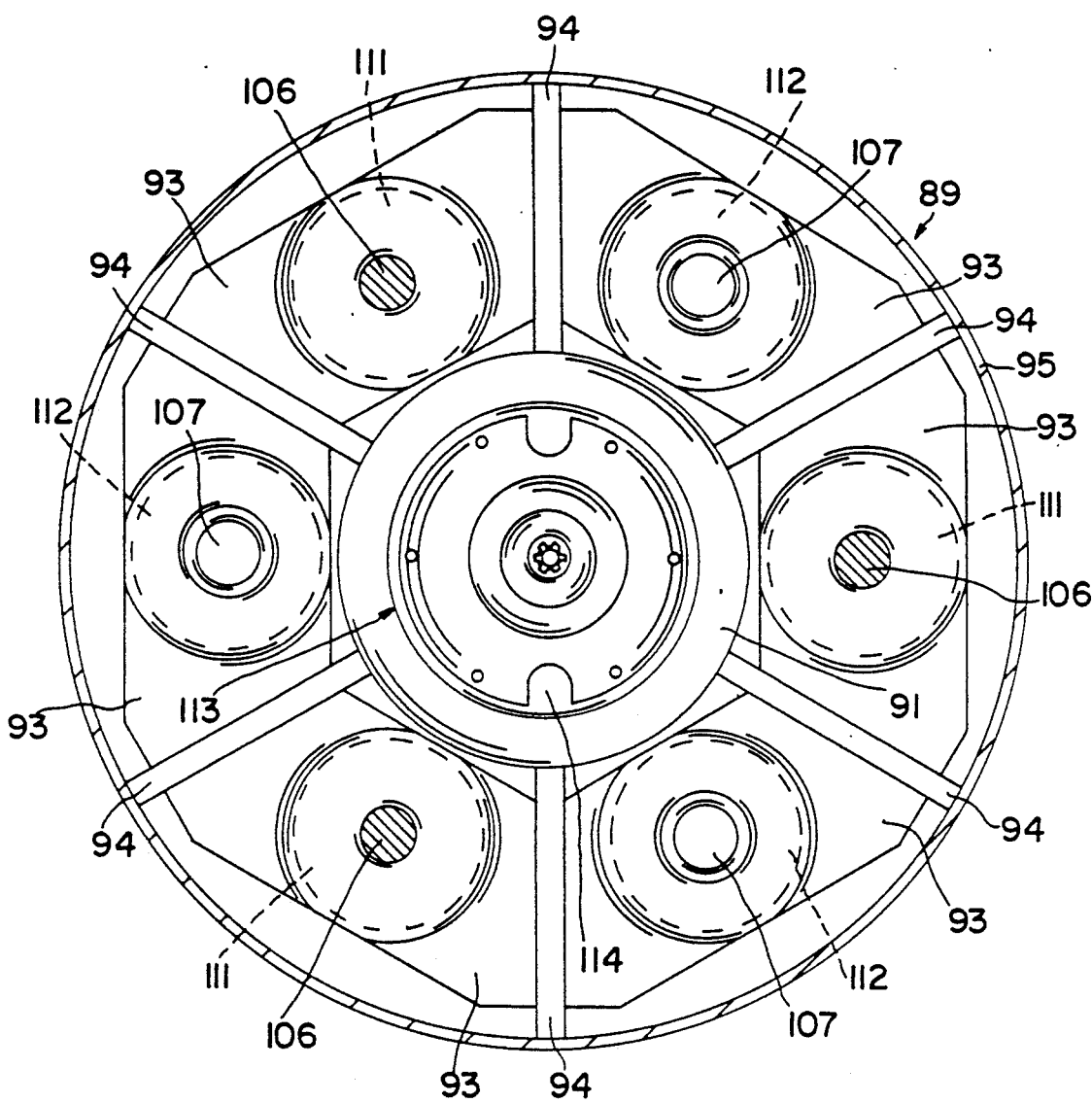
FIG. 7 shows a partially sectioned, enlarged plan view of a detail in FIG. 6.

The embodiment shown in FIGS. 6 and 7 relates to a road vehicle tire curing device 73 substantially similar to device 1. The component parts of this embodiment are indicated, where possible, using the same numbering system.

Device 73 comprises a toroidal curing mold 3; a gas curing unit 74 connected to mold 3; two annular heating plates 5 facing respective opposite axial ends of mold 3; and two annular insulating plates 6, each connected to and externally insulating a respective heating plate 5.

Like unit 4, unit 74 comprises a first portion 7 supporting turbine device 27, which differs from portion 7 of unit 4, solely by presenting a head 38 with an external thread 75. Portion 7 of unit 74 is connected through mold 3 to a second portion 76 functionally similar to, but differing in design from, second portion 8 of unit 4.

Portion 76 comprises a rigid frame 77 comprising two annular plates 78 and 79 coaxial with axis 14, the first of which is positioned, in use, contacting the outer axial surface of respective insulating plate 6. Frame 77 also comprises a sleeve 80 coaxial with axis 14 and integral with and located between the inner edges of plates 78 and 79. A tubular casing 81 coaxial with axis 14 is fitted contacting the outer edges of plates 78 and 79. A substantially cup-shaped metal bell 82 has its concavity facing the surface 83 of plate 79 opposite that facing plate 78, and has a convex end wall 84 blending with a cylindrical lateral wall 85. The free edge of wall 84 is connected integral with a rigid ring 86 coaxial with axis 14 and is connected by screws 87 to a ring 88 integral with the outer edge of surface 83.

Portion 76 also comprises a piston 89 sliding axially inside frame 77 against the thrust exerted by an elastic reaction system 90. As shown more clearly in FIG. 7, piston 89 comprises a sleeve 91 coaxial with axis 14 and sliding through a central hole 92 in plate 79. A polygonal annular plate 93 surrounds sleeve 91 and has a number of axial walls 94 by which plate 93 is rendered integral with both the outer surface of sleeve 91 and the inner surface of a bell 95 housed inside bell 82 and coaxial with axis 14. The free edge of bell 95 facing plate 79 is connected integral with a first ring 96 of a clamping device 97. Device 97 presents a second ring 98 coaxial with ring 96 and axis 14, and grips between rings 96 and 98, the inner edge of an annular membrane 99, the outer edge of which is gripped between rings 86 and 88, defining a second clamping device 100.

Together with membrane 99, bells 82 and 95 define a chamber 101 which communicates, via a fitting 102 through bell 82, with a pneumatic circuit 103 for supplying pressurized gas, more specifically nitrogen, to both chamber 101 and circuit 31.

Plate 93 presents two numbers of equally-spaced alternating through holes 104 and 105, engaged by respective pins 106 and 107, parallel to axis 14 and integral with plate 93. Pins 106 present the free ends facing and relatively close to surface 83 of plate 79, and slide inside respective holes formed in a second annular plate 108 integral with surface 83 and facing plate 93. Via the interposition of a guide, pins 107 slide axially inside respective sleeves 109, each having one end facing and relatively close to plate 93. Sleeves 109 are integral with plate 108, and extend through plate 108 and respective holes 110 formed through plate 79.

Elastic system 90 comprises a set of Belleville washers 111 compressed between plates 93 and 108 and coaxial with each of pins 106. A set of Belleville washers 112 is compressed between plates 93 and 108 and coaxial with each of sleeves 109.

Sleeve 91 houses an electric motor 113 having a casing 114 integral with sleeve 91, and an output shaft 115 coaxial with axis 14 and fitted with a plate 116. The outer edge of plate 116 is connected angularly to the inner surface of a further sleeve 117 having an external thread 118 mating with the internal thread 119 of sleeve 91. An internal thread 120 mates, in use, with the external thread 75 of head 38, so as to form a joint 121 for connecting portions 7 and 76 of curing unit 74.

As shown in FIG. 6, circuit 103 comprises a source 122 of heat exchange fluid, in this case pressurized nitrogen; and two branches 123 and 124 connected to source 122 by a distributor 125. Branch 123 is connected in a known manner (not shown) to circuit 31, while branch 124 is connected to fitting 102 and extends through a further distributor 126, the exhaust of which is connected directly to branch 123 via branch 127.

In actual use, distributors 125 and 126 are set so as to connect source 122 to chamber 101 and supply pressurized fluid, in this case the same nitrogen supplied to circuit 31, inside chamber 101. This moves piston 89 in relation to frame 77 and compresses washers 111 and 112 of elastic system 90. Portion 76 is then moved axially towards portion 7 until plate 78 contacts respective plate 6. Motor 113 is activated for rotating sleeve 117 about axis 14 and engaging joint 121, which, like joint 57, is a screw-nut-screw joint.

Engagement of joint 121 provides for packing mold 3 between plates 5 and 6 and between portions 7 and 76 of unit 74, which are subjected via elastic system 90, to additional pressure by exhausting distributors 125 and 126 and eliminating the pressure inside chamber 101.

It should be pointed out in connection with the above that, whereas jacks 48 on device 1 are pressurized throughout the curing process, chamber 101 on device 73 is only pressurized for the time taken to engage joint 121.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and the scope of the invention with the latter being determined solely by reference to the claims appended hereto.

I claim:

1. A road vehicle tire curing device comprising a toroidal mold for receiving a tire and having first and second coaxial cylindrical inner surfaces; external means for heating said mold; a gas curing unit connected to said mold and comprising a first and a second portion on either side of the mold; each of said cylindrical surfaces defines a seat for a respective one of said portions of the curing unit; a releasable joint being provided for connecting the two portions of the curing unit through the mold; and one of the two portions of the curing unit comprising axial thrust means for packing the mold and external heating means against the other portion.

2. A device as claimed in claim 1, in which the external heating means comprises two heating plates on either side of the mold.

3. A device as claimed in claim 2, in which each heating plate presents internal conduits for a heat exchange fluid.

4. A device as claimed in claim 1, in which the mold is a tire forming mold comprising an outer annular body, two inner annular supports for respective bead portions of the tire, and two lateral annular plates for respectively connecting the two inner annular supports to the outer annular body; the two inner annular supports defining said cylindrical inner surfaces; each lateral annular plate being positioned, in use, contacting the external heating means; and the outer annular body being substantially insulated from the external heating means.

5. A device as claimed in claim 1, in which said releasable joint is a screw-nut-screw joint comprising a screw portion and a nut screw portion fitted respectively to said two portions of the curing unit.

6. A device as claimed in claim 5, in which first actuating means is provided on one of said two portions of the curing unit for mutually rotating said two portions of said screw-nut-screw joint.

7. A device as claimed in claim 1, in which the said axial thrust means is a pressurized fluid thrust means.

8. A device as claimed in claim 7, in which said axial thrust means comprises second actuating means, in turn, comprising first and second elements moving in relation to each other; said releasable joint comprising third and fourth portions fitted respectively to said first and second portions of the curing unit; and one of said two elements of said second actuating means being axially integral with the third portion of said releasable joint.

9. A device as claimed in claim 8, in which said second actuating means comprises a body, and an output element moving axially in relation to said body and said mold; the first and second portions of the curing unit being fitted with said axial thrust means comprising a support for said body, said support being axially integral with the third portion of said releasable joint.

10. A device as claimed in claim 9, in which the first and second portions of the curing unit comprise respective frames for gripping said mold and said external heating means; one of said frames moving with said output element; and the other frame being locked axially in relation to the first portion of the curing unit.

11. A device as claimed in claim 1, in which the axial thrust means is an elastic thrust means.

12. A device as claimed in claim 11, in which compression means are provided for axially compressing said elastic thrust means.

13. A device as claimed in claim 12, in which said compression means is a pressurized fluid compression means.

14. A device as claimed in claim 12, in which said compression means comprises a body, and an output element moving axially in relation to said body and said mold; said output element being axially integral with a respective portion of said releasable joint; and said elastic thrust means being located between said body and said output element.

15. A device as claimed in claim 14, in which said first and second portions of the curing unit comprise respective frames for gripping said mold and said external heating means; one of said frames constituting said body, and the other frame being locked axially in relation to the first portion of the curing unit.

16. A device as claimed in claim 14, in which said body and said output element define a variable-volume chamber; in which supply means is provided for supplying pressurized fluid inside said chamber and dilating said chamber against the thrust exerted by said elastic thrust means.

17. A device as claimed in claim 13, including means for supplying a fluid to the curing unit and to the compression means; and in which the curing unit and the compression means are supplied with the same fluid.

* * * * *